United States Patent
Takahashi

(10) Patent No.: US 12,273,629 B2
(45) Date of Patent: Apr. 8, 2025

(54) IMAGE PROCESSING APPARATUS TO COMBINE IMAGES AND PERFORM IMAGE PROCESSING FOR EXTENDING THE DYNAMIC RANGE OF AN IMAGE

(71) Applicant: CANON KABUSHIKI KAISHA, Tokyo (JP)

(72) Inventor: Ryosuke Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 18/172,926

(22) Filed: Feb. 22, 2023

(65) Prior Publication Data
US 2023/0276135 A1    Aug. 31, 2023

(30) Foreign Application Priority Data
Feb. 28, 2022   (JP) .................................. 2022-030253

(51) Int. Cl.
  *H04N 23/741*   (2023.01)
  *H04N 23/76*    (2023.01)

(52) U.S. Cl.
  CPC .......... *H04N 23/741* (2023.01); *H04N 23/76* (2023.01)

(58) Field of Classification Search
  None
  See application file for complete search history.

(56) References Cited

U.S. PATENT DOCUMENTS

2006/0239582 A1* 10/2006 Hyoudou ............ H04N 23/741
                                                             348/297
2015/0263053 A1*  9/2015 Yamazaki ......... H01L 27/14643
                                                              257/43

FOREIGN PATENT DOCUMENTS

JP          2005072965 A     3/2005

* cited by examiner

*Primary Examiner* — Quan Pham
(74) *Attorney, Agent, or Firm* — Canon U.S.A., Inc. IP Division

(57) ABSTRACT

An image processing apparatus includes an image sensor configured to output a plurality of images obtained by applying different gains in one exposure where a capacity of a charge accumulation portion for accumulating electric charges is common to all of the images, a first combining unit configured to acquire the plurality of images and perform combining by adjusting brightness of an image other than a darkest image with brightness of the darkest image among the plurality of images, a second combining unit configured to perform combining by adjusting brightness of an image other than a lightest image with brightness of a lightest image among the plurality of images, and a combining method selection unit configured to select the first or second combining unit.

13 Claims, 10 Drawing Sheets

INPUT DATA IMAGE

POST-GAIN INPUT DATA IMAGE

COMBINED DATA IMAGE

INPUT DATA IMAGE

POST-GAIN INPUT DATA IMAGE

COMBINED DATA IMAGE

INPUT DATA IMAGE

NON-LINEAR
DATA IMAGE

POST-GAIN NON-
LINEAR DATA IMAGE

COMBINED
DATA IMAGE

IMAGE PROCESSING APPARATUS TO COMBINE IMAGES AND PERFORM IMAGE PROCESSING FOR EXTENDING THE DYNAMIC RANGE OF AN IMAGE

BACKGROUND

Technical Field

One disclosed aspect of the embodiments relates to an image processing apparatus that combines a plurality of images output from an image sensor and performs image processing for extending the dynamic range of an image, and to a method for controlling the image processing apparatus.

Description of the Related Art

There has conventionally been a combining processing technique for combining a plurality of images captured with different amounts of exposure. For example, connecting proper exposure signals of images having different amounts of exposure enables acquiring an image without overexposure or underexposure. With the improved sensor performance in recent years, an image sensor includes two different column circuits for the output signal from a unit pixel, and has an additional gain of the amplifier in the column circuit. Such an image sensor (Dual Gain Output (DGO)) is capable of outputting images with different gains. This image sensor can output two different images with different gains (a High-gain image and a Low-gain image) in one exposure. Based on the comparison between the two-image combination by DGO and the combination of two images acquired in time-division exposure, DGO has advantages of requiring no aligning process and being highly effective for moving object capturing. Therefore, DGO is compatible with image combination. As an example of a technique for combining images having different amounts of exposure, Japanese Patent Application Laid-Open No. 2005-72965 discusses a technique for extending the dynamic range by combining a low-exposure image and a high-exposure image.

SUMMARY

According to an aspect of the embodiments, an image processing apparatus includes an image sensor configured to output a plurality of images obtained by applying different gains in one exposure where a capacity of a charge accumulation portion for accumulating electric charges is common to all of the images, a first combining unit configured to acquire the plurality of images and perform combining by adjusting brightness of an image other than a darkest image with brightness of the darkest image among the plurality of images, a second combining unit configured to perform combining by adjusting brightness of an image other than a lightest image with brightness of a lightest image among the plurality of images, and a combining method selection unit configured to select the first or second combining unit. The image processing apparatus further includes a dictionary generation unit configured to generate dictionary data for subject detection based on teaching data and network structure restrictions, and an imaging apparatus for performing the subject detection based on the dictionary data generated by the dictionary generation unit, and subjecting a subject detected in the subject detection to predetermined imaging control.

Further features of the disclosure will become apparent from the following description of exemplary embodiments with reference to the attached drawings.

DESCRIPTION OF THE EMBODIMENTS

Exemplary embodiments will be described in detail below with reference to the accompanying drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device, circuit, or controller. A memory contains instructions or program that, when executed by the CPU, causes the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Figure 1:
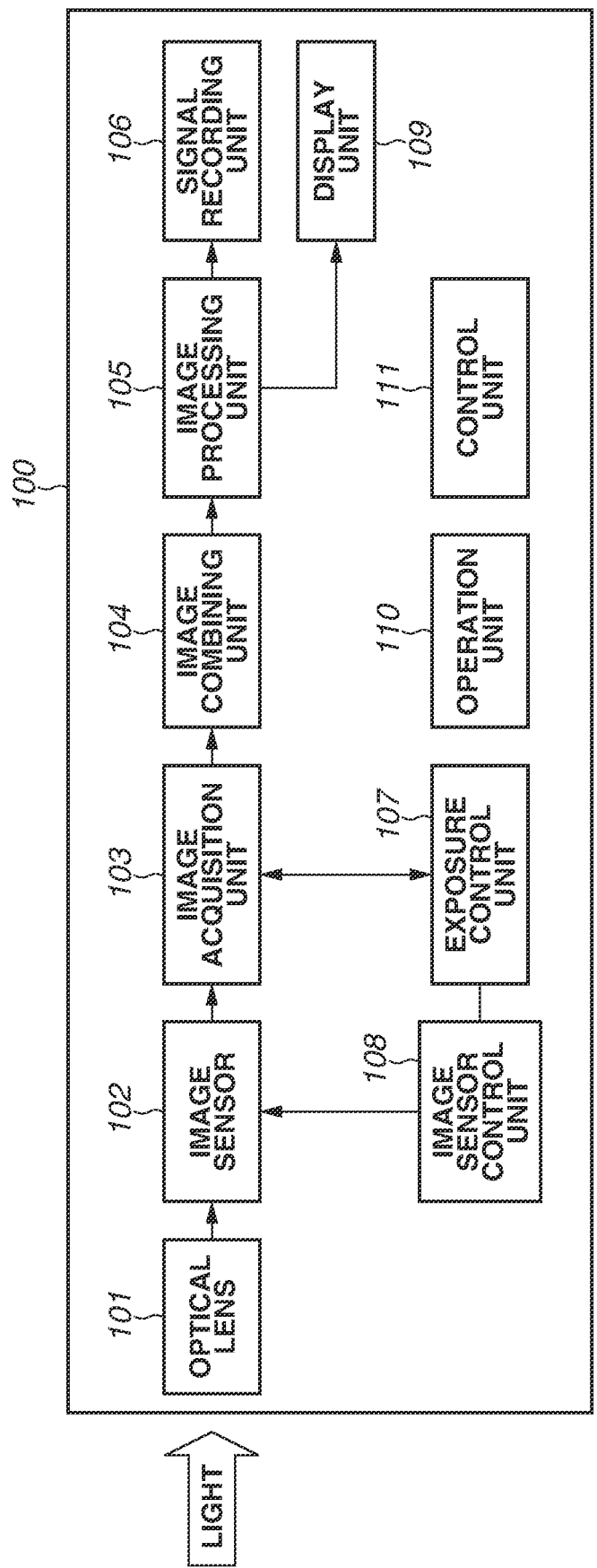
FIG. 1 is a general block diagram illustrating an imaging apparatus according to an exemplary embodiment.

FIG. 1 is a block diagram illustrating an imaging apparatus 100 as an example of an image processing apparatus according to the present exemplary embodiment. The imaging apparatus 100 includes an optical lens 101, an image sensor 102, an image acquisition unit or circuit 103, an image combining unit or circuit 104, an image processing unit or circuit 105, a signal recording unit or circuit 106, an exposure control unit or circuit 107, an image sensor control unit or circuit 108, a display unit or circuit 109, an operation unit or circuit 110, and a control unit or circuit 111.

The optical lens 101 captures the light of a subject and supplies a focused image to the image sensor 102.

The image sensor 102 receives incident light from the optical lens 101, converts the light into an electrical signal, and outputs the signal. Examples of typical image sensors include a Charge Coupled Device (CCD) image sensor and a Complementary Metal Oxide Semiconductor (CMOS) image sensor.

Image signals output from these image sensors 102 are classified into two types. One type is a directly output analog image signal, and the other type is digital data generated through analog-to-digital (A/D) conversion processing and Low Voltage Differential Signaling (LVDS) in the image sensor 102.

Figure 2:
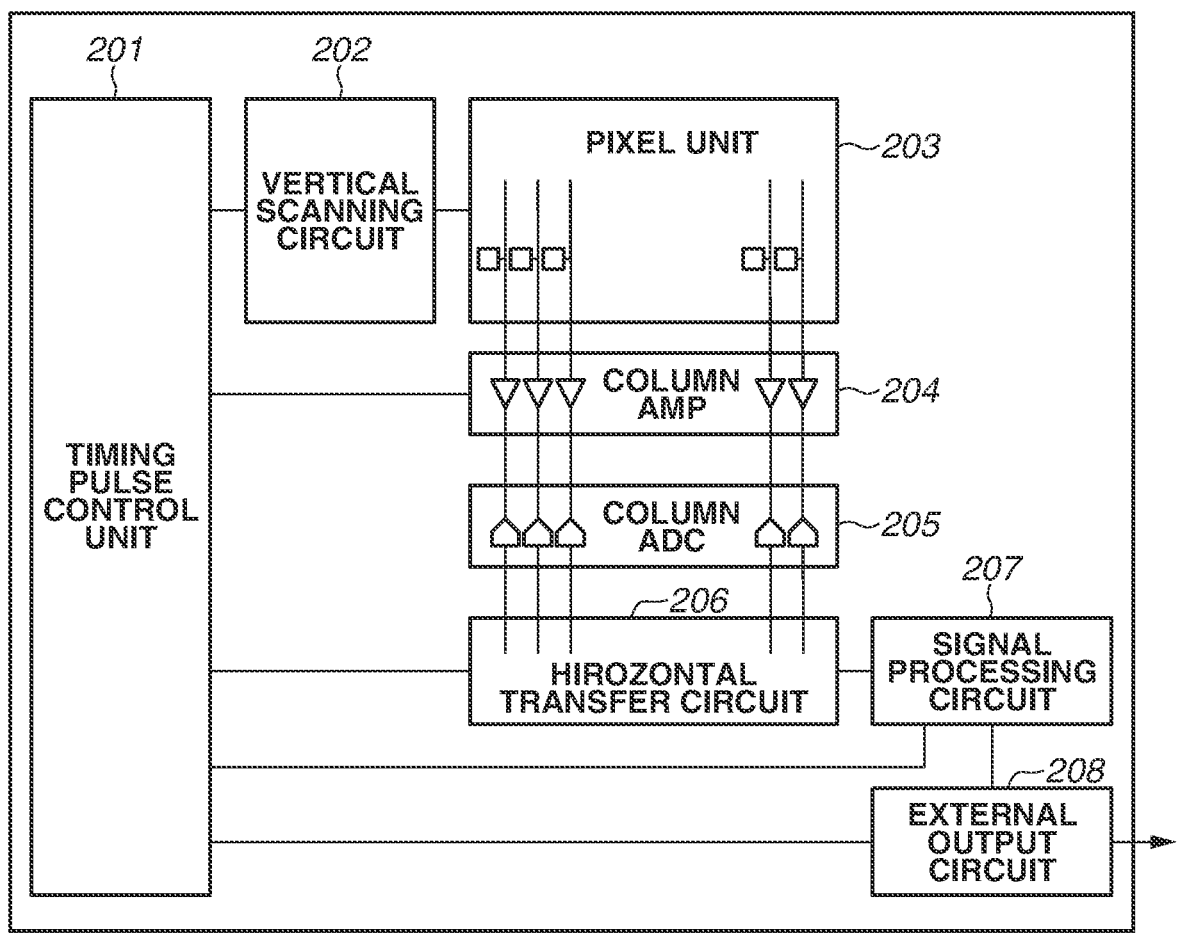
FIG. 2 is an internal block diagram illustrating a solid-state image sensor.

FIG. 2 is a block diagram illustrating an image sensor as an example of the image sensor.

A timing pulse control unit or circuit 201 supplies an operation CLK and a timing signal to each block of this image sensor to control the operation of the image sensor.

A vertical scanning circuit 202 controls the timing of sequentially reading pixel signal voltages of a pixel unit or circuit 203 having two-dimensionally arranged pixels, in one frame. Generally, the image signals are sequentially read for each row from the top row downward in one frame. The present exemplary embodiment enables selecting whether to output phase difference information from the pixel unit 203.

The pixel unit 203 is a photoelectric conversion element that performs photoelectric conversion according to the incident light quantity and outputs a voltage. A column amplifier 204 is used to electrically amplify the signals read from the pixel unit 203. The column amplifier 204 amplifies the signals to amplify pixel signal levels with respect to noise output from a subsequent column Analog Digital Convertor (ADC) 205, equivalently improving the signal-to-noise (S/N) ratio. The gain of the column amplifier 204 can be changed by the timing pulse control unit 201.

According to the present exemplary embodiment, the image sensor 102 includes the column amplifier 204 having two different input memories for image combining, and is capable of changing the column amplifier gain to output two different gains. Providing two different input memories enable applying two different gains to the signal read from a photo diode at a certain time before outputting the signal. This makes it possible to acquire two different images with different gains having simultaneity although the amount of data increases.

The column ADC 205 subject the read signals from the column amplifier 204 to A/D conversion. The generated digital signals are sequentially read by a horizontal transfer circuit 206. The output of the horizontal transfer circuit 206 is input to a signal processing circuit 207 that performs signal processing in digital form. The digital processing not only adds a predetermined amount of offset value but also performs a shift operation and multiplication to perform gain calculation in a simplified way. Since the pixel unit 203 includes a pixel region where light is intentionally blocked, a digital black level clamp operation may be performed by using the pixel region.

The output of the signal processing circuit 207 is transferred to an external output circuit 208. The external output circuit 208 having a serializer function converts a multi-bit input parallel signal from the signal processing circuit 207 into a serial signal. The external output circuit 208 also converts the serial signal into a LVDS signal, for example, and outputs the LVDS signal to communicate image information with an external device.

The image acquisition unit 103 includes blocks for capturing the image signal output from the image sensor 102 and performing processing. When the A/D conversion is not to be performed by the image sensor 102, the image acquisition unit 103 also includes an analog front end for performing the A/D conversion. The image acquisition unit 103 eliminates fixed pattern noise of the image sensor 102 and black level clamp processing. The image acquisition unit 103 also has the role of separating the image signal into an image to be used for image signal recording and an evaluation signal for image sensor control.

The image combining unit 104 performs the image combining based on the image signal output from the image sensor by using an optional combining method. The term "combining" here refers to an operation that combines, integrates, or incorporates image features of component images or merge the image features of component images together to form a new image. The image processing unit 105 has a pixel addition function as a typical image processing function of the imaging apparatus, and performs various kinds of image processing such as noise reduction, gamma correction, knee correction, digital gain, and defect correction. The image sensor 102, the image acquisition unit 103, and the image combining unit 104 may be provided as a plurality of different chips in the imaging apparatus 100, or integrally configured as an image sensor having a stacked layer structure.

The signal recording unit 106 records the image signal received from the image processing unit 105 in a storage device or a storage medium.

The exposure control unit 107 calculates the optimum amount of exposure based on image signal information received from the image acquisition unit 103, determines the operation of the image sensor control unit 108, and transmits relevant control.

The display unit 109 displays an image processed by the image processing unit 105 and image information on a display unit such as a liquid crystal display.

The operation unit 110 is an input unit for receiving a user operation and issuing an operating instruction to the control unit 111. The operation unit 110 includes various operating members such as a shutter button, an electronic dial, a power switch, four-way operation keys, buttons, and a touch panel. The touch panel is stacked on the liquid crystal of the display unit 109, and serves as an input device for outputting coordinate information corresponding to a touched position.

The operation of the image sensor 102 at the time of image generation and the image combining unit 104 will be described below.

Figure 3:
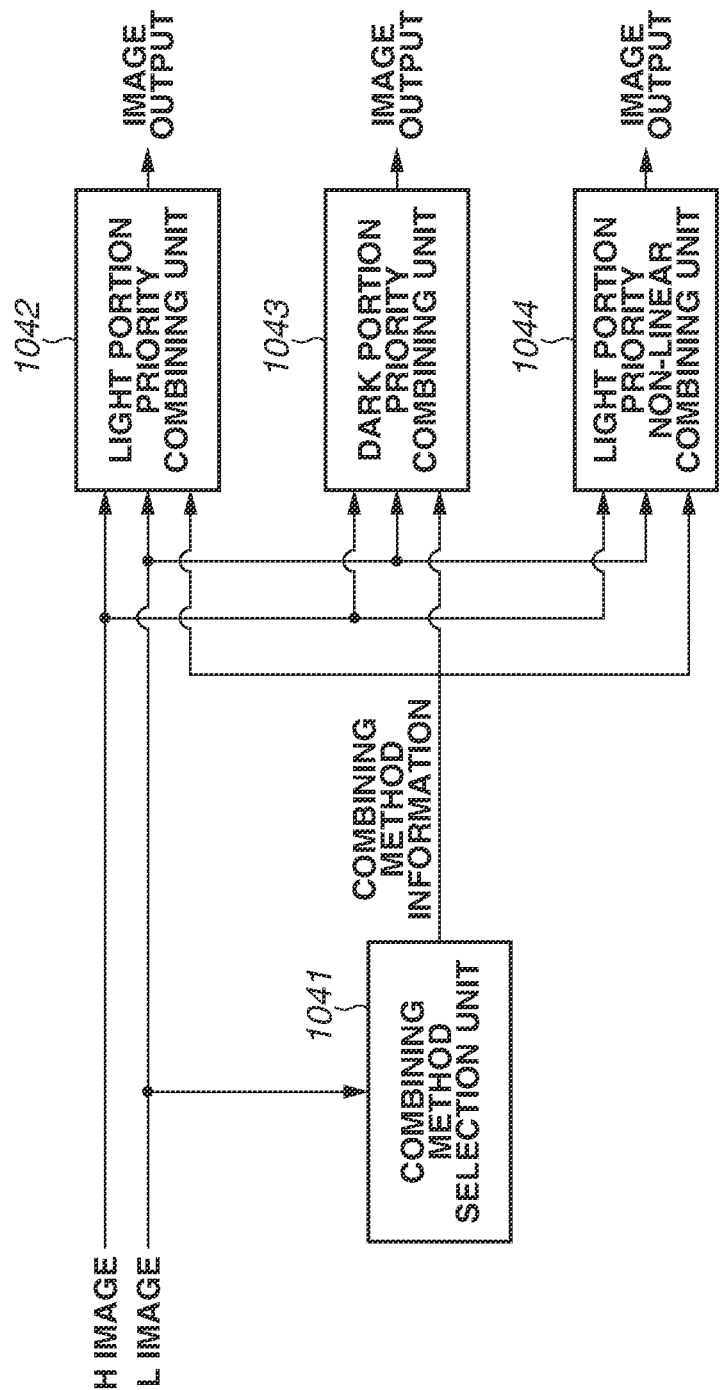
FIG. 3 is a block diagram illustrating processing of an image combining unit.

As described above, the image sensor 102 according to the present exemplary embodiment can change the column amplifier gain to generate an image before outputting the image. FIG. 3 is a detailed block diagram illustrating processing performed by the image combining unit 104 for the two images applied with two different gains output from the image sensor 102. Of the two images, the image applied with a relatively high gain is referred to as a High Gain image (hereinafter referred to as an H image), and the image applied with a relatively low gain is referred to a Low Gain image (hereinafter referred to as an L image).

A combining method selection unit 1041 is a processing unit that selects an image combining method. According to the present exemplary embodiment, the combining method selection unit 1041 automatically selects a combining method based on the luminance value distribution of the L image. However, the disclosure is not limited thereto. The combining method may be selected based on the luminance value distribution of the H image. Alternatively, the user may manually set a combining method on the combining method selection unit 1041 in a selective way via the operation unit 110 on the imaging apparatus 100. Any one among these selection methods for selecting the combining method may be selected through a mode setting.

Figure 4:
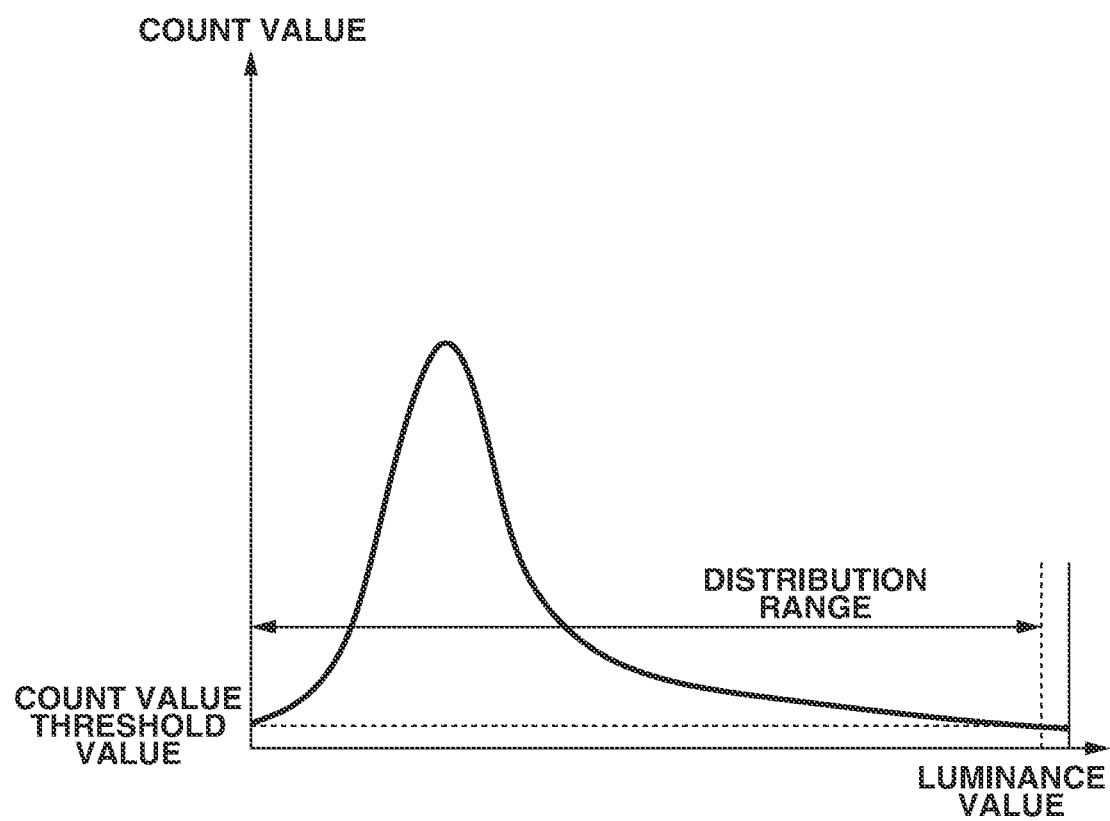
FIG. 4 illustrates an image of a luminance value distribution.

The combining method selection unit 1041 initially calculates the luminance value of each pixel of the L image. The CCD and CMOS sensors often employ a Bayer array structure in which each pixel has only one type of color information. In calculating the luminance value for each pixel, therefore, the present exemplary embodiment interpolates the color information not provided by the pixel based on information for neighborhood pixels. Then, the present exemplary embodiment multiplies each piece of color information by a predetermined coefficient to calculate the luminance value. However, the algorithm for the luminance value calculation is not limited to the above-described method but can be an optional method. The combining method selection unit 1041 calculates the luminance value distribution (luminance value histogram) of the L image based on the calculated luminance of each pixel. FIG. 4 illustrates an image of the luminance value distribution. The horizontal value indicates the luminance value in the image, and the vertical axis indicates the count value for each luminance value in the image.

The combining method selection unit 1041 determines the distribution range of the luminance value. The distribution range according to the present exemplary embodiment refers to the distance between the maximum and minimum luminance values having a count value exceeding a count value threshold value (difference between the luminance values). FIG. 4 illustrates the image of the count value threshold value and the distribution range. The count value threshold value is the threshold value of the minimum count value to be used in the calculation of the distribution range. The purpose of excluding the luminance region with a small count value from the distribution range by using the count value threshold value is to exclude a noise region.

The combining method selection unit 1041 further selects a combining method from at least two of the dark portion priority combining, the light portion priority combining, and the light portion priority non-linear combining based on the determined luminance distribution range.

Figure 5A:
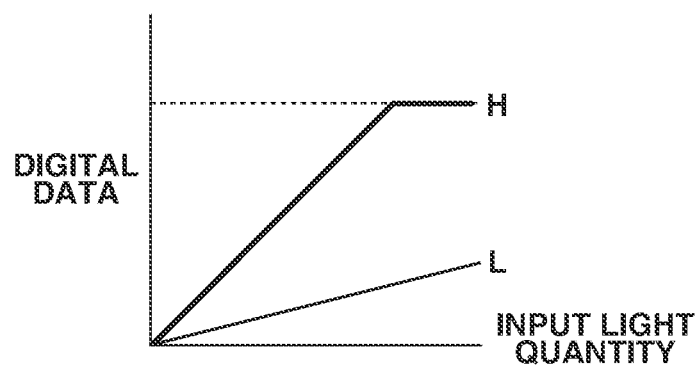
FIGS. 5A to 5C illustrate images of dark portion priority combining.
Figure 5B:
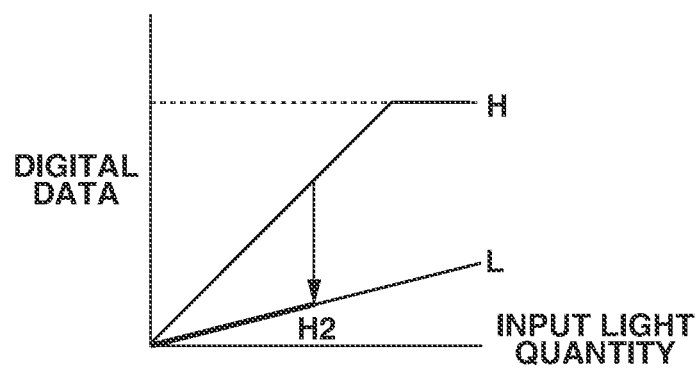
Figure 5C:
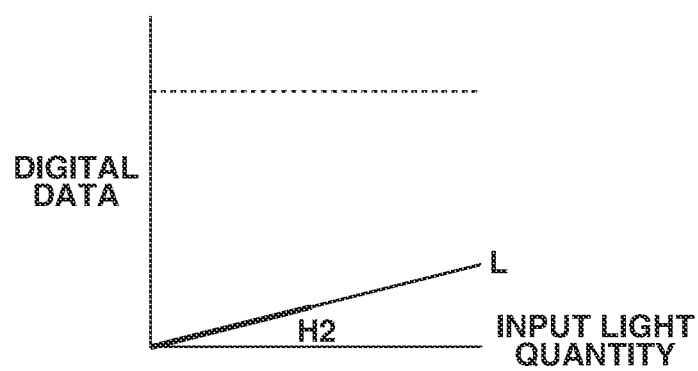
Figure 6A:
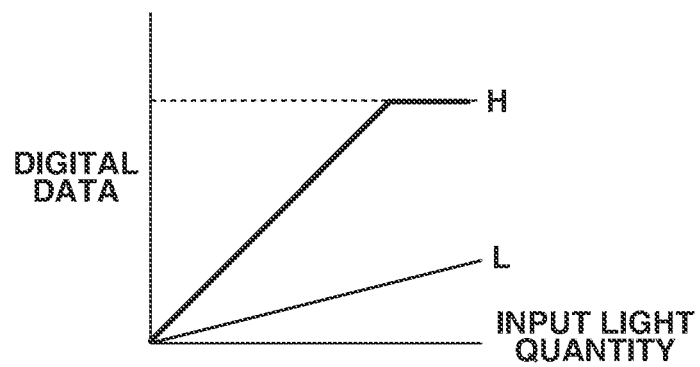
FIGS. 6A to 6C illustrate images of light portion priority combining.
Figure 6B:
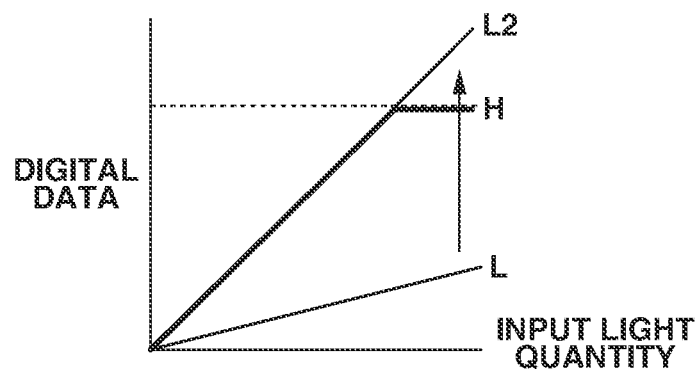
Figure 6C:
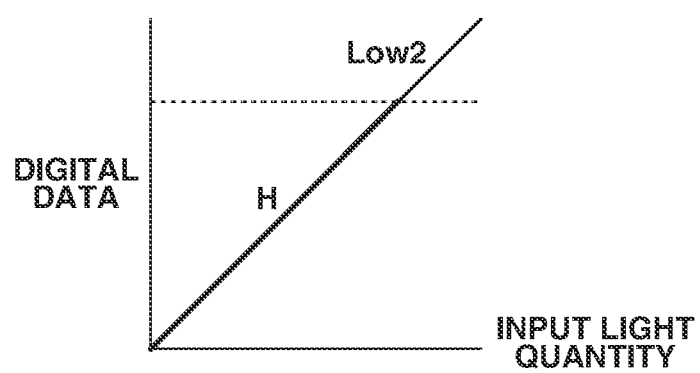

Each combining method will be described below. FIGS. 5A to 5C illustrate images of dark portion priority combining. FIGS. 6A to 6C illustrate images of light portion priority combining. FIGS. 7A to 7D illustrate images of light portion priority non-linear combining. Each of FIGS. 5A to 7D illustrates a relation between the input light quantity and digital data. The dotted lines in FIGS. 5A to 7D illustrate the maximal value that can be represented by one image before the combining.

The dark portion priority combining is a combining method for adjusting the exposure of the H image with that of the L image. As illustrated in FIG. 5B, this method generates an H2 image by applying a gain for decreasing the value to the H image, and uses the H2 image for the dark region and the L image for the light region at the time of combining. The H2 image has a small noise value since it is applied with a gain for decreasing the value. According to present exemplary embodiment, the dark and light regions are preset. Although, according to the present exemplary embodiment, the method uses the H2 image for the dark region and the L image for the light region, the H and L2 images may be combined according to the luminance. Using such a combining method enables generating a combined image having less noise in the dark region than in the image before the combining. Although, in present exemplary embodiment, this method uses the H image in the low-luminance region and the L2 image in the high-luminance region, the H and L2 images may be combined according to the luminance.

The light portion priority combining is a combining method for adjusting the exposure of the L image with that of the H image. As illustrated in FIG. 6B, this method generates an L2 image by applying a gain for increasing the value to the L image, and mainly uses the H image for the dark region and the L2 image for the light region at the time of combining. Although, in present exemplary embodiment, this method uses the H image in the dark region and the L2 image in the light region, the H and L2 images may be combined according to the luminance. Using such a combining method makes it possible to generate an image enabling the representation of light portion gradations which has been impossible before the combining. However, if digital data exceeds the maximum value that can be represented by one image, as illustrated in FIG. 6C, the number of bits of the digital data required to represent the data is larger than that before the combination.

Figure 7A:
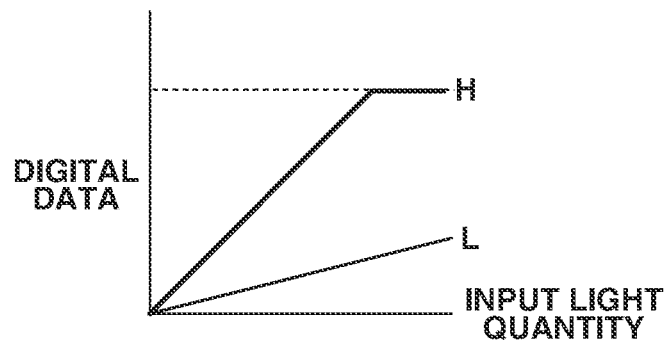
FIGS. 7A to 7D illustrate images of light portion priority non-linear combining.
Figure 7B:
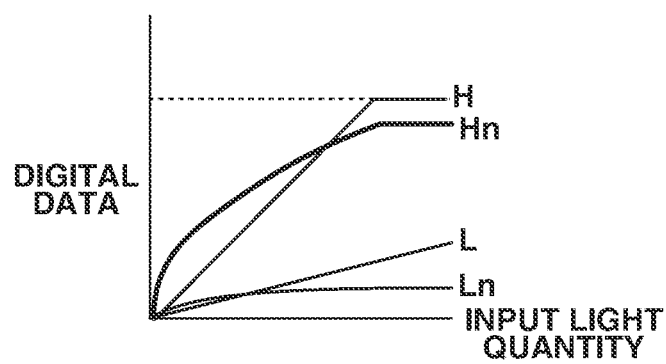
Figure 7C:
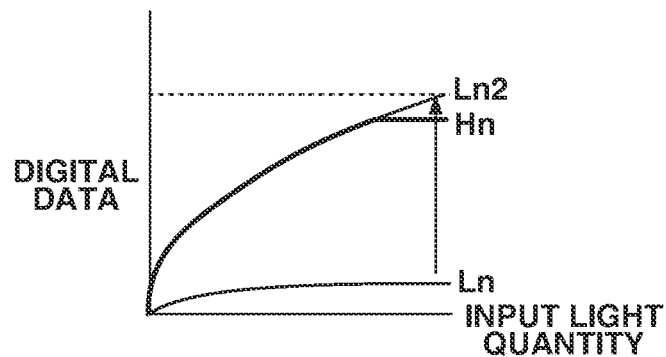
Figure 7D:
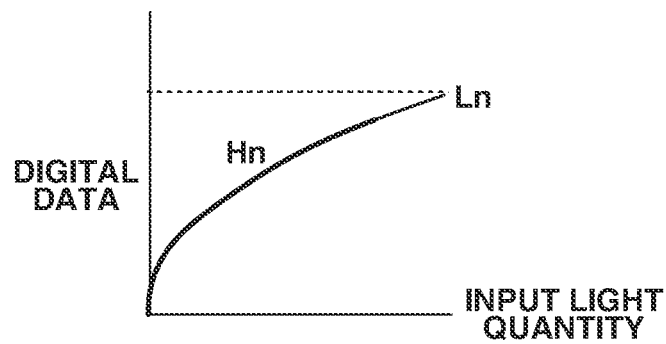

The light portion priority non-linear combining is a combining method for adjusting the exposure of the L image with that of the H image, like the light portion priority combining. However, unlike the light portion priority combining, this combining method coverts the L and H images into non-linear images (Ln and Hn images, respectively) before the combining, as illustrated in FIG. 7B. As described above, in the light portion priority combining, the number of bits of the data after the combining may become larger than that before the combining. In this case, the increased bit width may exceed the data width that can be processed by the image processing apparatus. Therefore, converting the H and L images into non-linear images before the combining makes it possible to generate an image enabling the representation of light portion gradations which has been impossible before the combining while restraining the bit width increase of the data after the combining.

Figure 8:
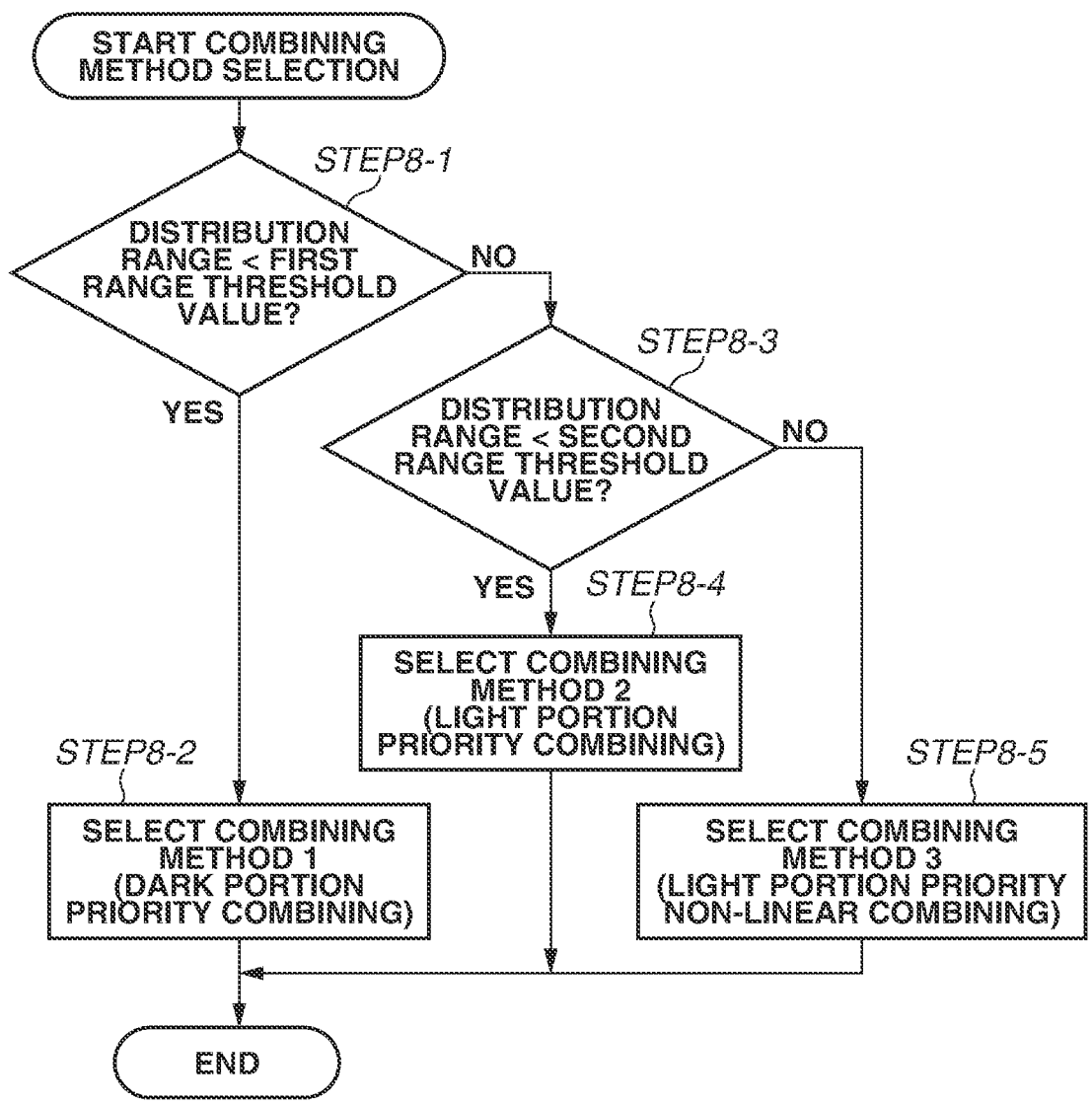
FIG. 8 is a flowchart illustrating processing of a combining method selection unit.

FIG. 8 is a flowchart illustrating combining method selection processing of the combining method selection unit 1041. A first range threshold value and a second range threshold value in FIG. 8 are preset distribution range values. The first range threshold value determines whether the exposure of the L image is adjusted with that of the H image, or the exposure of the H image is adjusted with that of the L image. The second range threshold value determines whether the conversion into non-linear images is to be performed before the combining.

(STEP8-1)

When the luminance distribution range is smaller than the first range threshold value (YES in STEP8-1), the processing proceeds to STEP8-2. In STEP8-2, the combining method selection unit 1041 selects the dark portion priority combining as the combining method.

(STEP8-3)

When the luminance distribution range is equal to or larger than the first range threshold value (NO in STEP8-1) and smaller than the second range threshold value (YES in STEP8-3), the processing proceeds to STEP8-4. In STEP8-4, the combining method selection unit 1041 selects the light portion priority combining. On the other hand, when the luminance distribution range is equal to or larger than the second range threshold value (NO in STEP8-3), the processing proceeds to STEP8-5. In STEP8-5, the combining method selection unit 1041 selects the light portion priority non-linear combining. The combining method selection is not limited to the above-described exemplary embodiment. The dark portion priority combining or the light portion priority non-linear combining may be selected based on the first range threshold value. The light portion priority combining or the light portion priority non-linear combining may be selected based on the second range threshold value.

After selecting a combining method, the combining method selection unit 1041 outputs the combining method information to the dark portion priority combining unit 1042, the light portion priority combining unit 1043, and the light portion priority non-linear combining unit 1044. The combining method information includes information required for combining and combining flag information indicating whether to perform the combining.

Upon reception of the combining method information, the dark portion priority combining unit 1042, the light portion priority combining unit 1043, and the light portion priority non-linear combining unit 1044 perform image combining when the combining flag information is set to perform the combining. The light portion priority combining method unit 1043 performs the image combining based on the input H and L images and the image information by using the light portion priority combining method, and outputs the combined image. The dark portion priority combining method unit 1042 performs the image combining based on the input H and L images and the image information by using the dark portion priority combining method, and outputs the combined image. The light portion priority non-linear combining unit 1044 performs the image combining based on the input H and L images and the image information by using the light portion priority non-linear combining method, and outputs the combined image.

As described above, the present exemplary embodiment is configured to enable adaptively selecting a method for combining images generated with a plurality of different gains, thus providing a combining method more suitable for the subject.

Second Exemplary Embodiment will be described. Exemplary embodiments will be described below with reference to the accompanying drawings.

Figure 9:
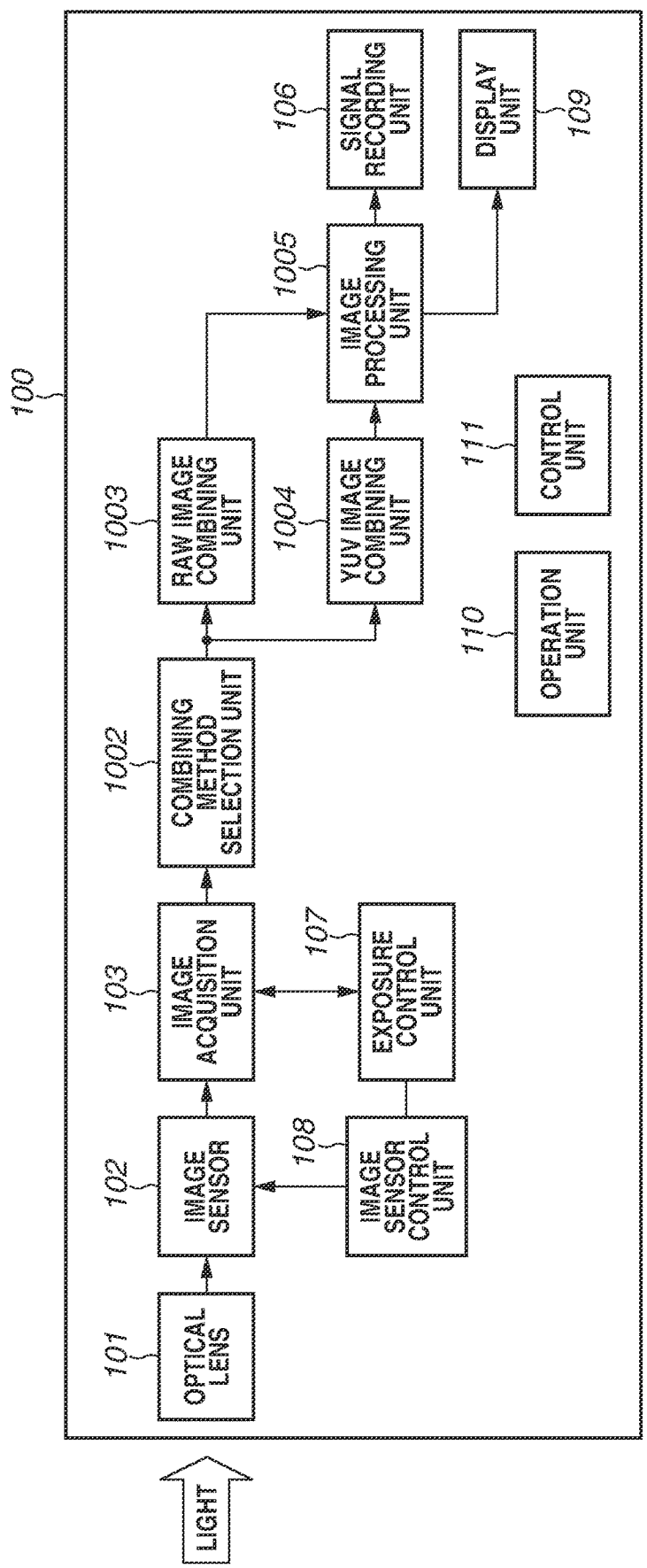
FIG. 9 is a block diagram illustrating an imaging apparatus according to a second exemplary embodiment.

FIG. 9 is a block diagram illustrating an imaging apparatus as an example of the image processing apparatus according to the present exemplary embodiment. Elements having the same reference numerals as those in FIG. 1 are processing units similar to those according to the first exemplary embodiment, and redundant descriptions thereof will be omitted.

The imaging apparatus according to the present exemplary embodiment is capable of capturing a still image and a moving image. According to the present exemplary embodiment, the settings performed via the operation unit 110 enable setting whether both or either one of a RAW image as a linear image and a Joint Photographic Experts Group (JPEG) image as a non-linear image is to be recorded in still image capturing. The settings performed via the operation unit 110 enable setting the frame rate of a moving image to be recorded in addition to the above-described setting in moving image capturing.

The operation unit 110 provides an interface for accepting a combining method instruction from the user to allow the user to set items settable on the imaging apparatus. The imaging apparatus according to the present exemplary embodiment enables at least the following settings:

Recording setting in still image capturing (set whether both or either one of a RAW image and a JPEG image is to be recorded)

Frame rate setting in moving image capturing (30, 60, or 240 FPS can be set according to the present exemplary embodiment)

The operation unit 110 outputs received setting item information to the control unit 111, and the control unit 111 sets the information to the combining method selection unit 1002.

The combining method selection unit 1002 is a processing unit or circuit that selects an image combining method. According to present exemplary embodiment, the combining method selection unit 1002 selects an image combining method based on the image input from the image acquisition unit 103 and the setting item information input from the operation unit 110. Selectable combining methods include the RAW combining and the YUV combining. The RAW combining is combining processing performed in a linear space in a linear image state. The YUV combining is combining processing performed in a non-linear space in a non-linear image state (YUV format). The RAW combining according to the present exemplary embodiment is processing intended to reduce noise in the dark portion to a further extent than that before the combining. A combined RAW image can be recorded as a file. The YUV combining according to the present exemplary embodiment is processing intended to diversify the gradation representation of the light portion than that before the combining. Since the RAW combining is not performed, a RAW image after the combining cannot be recorded as a file. However, the processing speed is higher than that in the RAW combining. When the combining method selection unit 1002 selects the RAW combining as a combining method, the combining method selection unit 1002 outputs an image to the RAW image combining unit 1003. On the other hand, when the combining method selection unit 1002 selects the YUV combining, the combining method selection unit 1002 outputs an image to the YUV image combining unit 1004.

Figure 10:
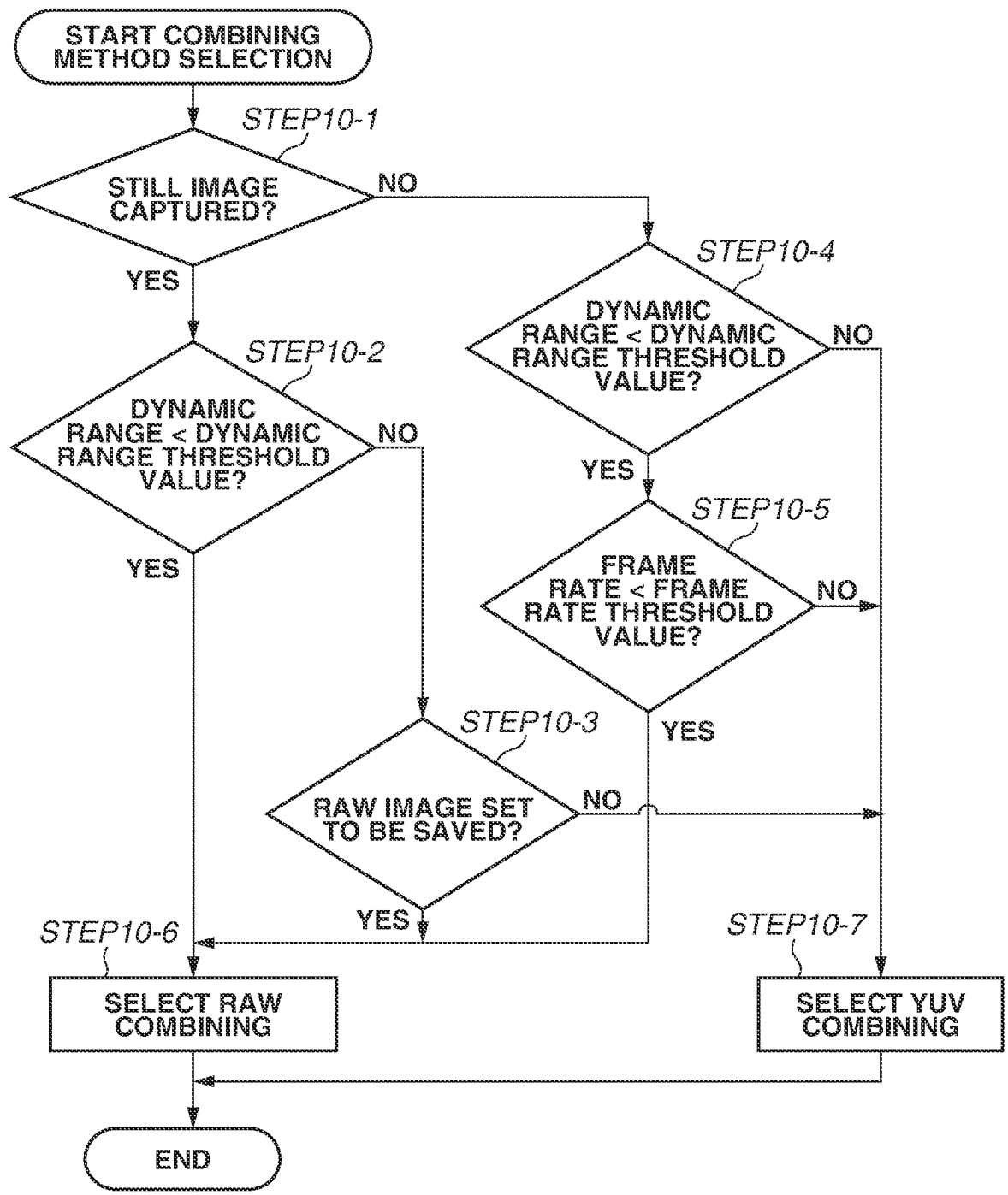
FIG. 10 is a flowchart illustrating processing of a combining method selection unit.

FIG. 10 is a flowchart illustrating the combining method selection by the combining method selection unit 1002. Each piece of processing will be described below.

(STEP10-1)

The combining method selection unit 1002 determines whether a still image is captured, based on the setting item information. When a still image is captured (YES in STEP10-1), the processing proceeds to STEP10-2. On the other hand, when a still image is not captured (NO in STEP10-1), the processing proceeds to STEP10-4.

(STEP10-2)

The combining method selection unit 1002 calculates the dynamic range of the image based on the input L image. The dynamic range according to the present exemplary embodiment is the differences between the maximum value and the minimum luminance value. However, the dynamic range calculation method is not limited thereto. The combining method selection unit 1002 compares the calculated dynamic range with a preset dynamic range threshold value. When the calculated dynamic range is less than the dynamic range threshold value (YES in STEP10-2), the processing proceeds to STEP10-6. On the other hand, when the calculated dynamic range is equal to or larger than the dynamic range threshold value (NO in STEP10-2), the processing proceeds to STEP10-3.

(STEP10-3)

The combining method selection unit 1002 determines whether a RAW image is set to be recorded, based on the setting item information. When a RAW image is set to be recorded (YES in STEP10-3), the processing proceeds to STEP10-6. On the other hand, when a RAW image is not set to be recorded (NO in STEP10-3), the processing proceeds to STEP10-7.

(STEP10-4)

The combining method selection unit 1002 calculates the dynamic range of the image based on the input L image. According to the present exemplary embodiment, the dynamic range refers to the difference between the maximum value and the minimum luminance value. However, the dynamic range calculation method is not limited thereto. The combining method selection unit 1002 compares the calculated dynamic range with a preset dynamic range threshold value. When the calculated dynamic range is less than the dynamic range threshold value (YES in STEP10-4), the processing proceeds to STEP10-5. On the other hand, when the calculated dynamic range is equal to or larger than the dynamic range threshold value (NO in STEP10-4), the processing proceeds to STEP10-7.

(STEP10-5)

The combining method selection unit 1002 compares the frame rate of the moving image with a preset frame rate threshold value. When the frame rate of the moving image is less than the frame rate threshold value (YES in STEP10-5), the processing proceeds to STEP10-6. On the other hand, when the frame rate of the moving image is equal to or larger than the frame rate threshold value (NO in STEP10-5), the processing proceeds to STEP10-7.

(STEP10-6)

The combining method selection unit 1002 selects the RAW combining as a combining method.

(STEP10-7)

The combining method selection unit 1002 selects the YUV combining as a combining method.

The RAW image combining unit 1003 is a processing unit that performs the RAW image combining and image processing. At the time of image combining, the RAW image combining unit 1003 applies a gain to the H image to adjust the exposure with that of the L image. The H image applied with a gain is referred to as an H2 image. Then, the RAW image combining unit 1003 performs the combining by using the H2 image for the dark region and the L image for the light region. The RAW image combining unit 1003 converts a combined RAW image into a YUV image. The RAW image combining unit 1003 is capable of subjecting a RAW image before the combining, a RAW image after the combining, and a YUV image to various kinds of image processing. The RAW image combining unit 1003 outputs the combined RAW image and the YUV image to the image processing unit 3.

The YUV image combining unit 1004 is a processing unit that performs the YUV image combining and image processing. The YUV image combining unit 1004 converts the H and L images into YUV images (an HY image and an LY image, respectively). Then, the YUV image combining unit 1004 applies a gain to the LY image to adjust the exposure with that of the HY image (the resultant image is referred to as an LY2 image.) Then, the YUV image combining unit 1004 performs the combining by using the LH image for the dark region and the LY2 image for the light region. The YUV image combining unit 1004 is capable of subjecting a RAW image before the combining, a YUV image before the combining, and a YUV image after the combining to various kinds of image processing. The YUV image combining unit 1004 outputs the combined YUV image to the image processing unit 3.

The image processing unit 1005 is a processing unit that subjects the input YUV image to image processing. The image processing unit 1005 subjects the input YUV image to various kinds of image processing and outputs the YUV image and the RAW image (if it is input) to the signal recording unit 106.

According to the present exemplary embodiment, as described above, selecting a combining method according to the imaging settings enables providing a combining method more suitable for the subject and providing a combined image with a higher image quality.

While the disclosure has specifically been described based on the above-described exemplary embodiments, the disclosure is not limited thereto but can be modified and changed in diverse ways within the ambit of the appended claims.

Other Exemplary Embodiments

The object of the disclosure can also be achieved in the following way. More specifically, a storage medium storing a program code of software describing procedures for implementing the functions of the above-described exemplary embodiments is supplied to a system or apparatus. Then, a computer (or Central Processing Unit (CPU) or Micro Processing Unit (MPU)) of the system or apparatus reads the program code stored in the storage medium and then executes the program code.

In this case, the program code itself read from a storage medium implements new functions of the disclosure, and the storage medium storing the program code and the program are also included in the disclosure.

Examples of storage media for supplying a program code include a flexible disk, hard disk, optical disk, and magneto-optical (MO) disk. In addition, a compact disc read only memory (CD-ROM), compact disc recordable (CD-R), compact disk rewritable (CD-RW), digital versatile disc read only memory (DVD-ROM), digital versatile disc random access memory (DVD-RAM), digital versatile disc rewritable (DVD-RW), digital versatile disc recordable (DVD-R), magnetic tape, nonvolatile memory card, and ROM are also applicable.

The functions of the above-described exemplary embodiments are implemented when the computer executes a read program code. Further, a case where an operating system (OS) operating on the computer performs a part or the whole of actual processing based on instructions of the program, and the functions of the above-described exemplary embodiments are implemented by the processing is also included in the disclosure.

The following cases are also included in the disclosure. First of all, a program code read from a storage medium is written in a memory included in a function expansion board inserted into the computer or a function expansion unit connected to the computer. Subsequently, a CPU included in the function expansion board or function expansion unit executes a part or the whole of actual processing based on instructions of the program code.

The disclosure is not limited to apparatuses mainly intended for image capturing, such as digital cameras, but is applicable to optional apparatuses incorporating an imaging apparatus or connected with an external imaging apparatus, such as portable phones, (laptop, desktop, and tablet) personal computers, and game machines. Therefore, the "imaging apparatus" according to the present specification is intended to include an optional electronic apparatus having an imaging function.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-030253, filed Feb. 28, 2022, which is hereby incorporated by reference herein in its entirety.

What is claimed is:

1. An image processing apparatus comprising:
   a processor; and
   a memory containing instructions that, when executed by the processor, cause the processor to function as:
   an acquisition unit configured to acquire a plurality of images generated by applying different gains to an image acquired in one exposure;
   a first combining unit configured to perform combining by adjusting brightness of an image other than a first image with brightness of the first image among the plurality of images;
   a second combining unit configured to perform combining by adjusting brightness of an image other than a second image with brightness of the second image, the second image being brighter than the first image among the plurality of images; and
   a combining method selection unit configured to select which of the combining by the first combining unit and the combining by the second combining unit is to be used to combine the plurality of images acquired by the acquisition units,
   wherein the second combining unit includes a combining unit configured to perform combining based on a linear image, and a combining unit configured to perform combining based on a non-linear image.

2. The image processing apparatus according to claim 1, wherein the combining method selection unit calculates a dynamic range by using at least one of the plurality of images and performs the selection according to the calculated dynamic range.

3. The image processing apparatus according to claim 2,
   wherein, in a case where the calculated dynamic range is smaller than a first threshold value, the combining method selection unit selects the first combining unit to perform combining, and
   wherein, in a case where the calculated dynamic range is larger than the first threshold value, the combining method selection unit selects the second combining unit to perform combining.

4. The image processing apparatus according to claim 2,
   wherein, in a case where the calculated dynamic range is smaller than a second threshold value, the combining method selection unit selects the first combining unit to perform combining in a state where the plurality of images includes linear images, and
   wherein, in a case where the calculated dynamic range is larger than the second threshold value, the combining method selection unit selects the second combining unit to perform combining in a state where the plurality of images includes non-linear images.

5. The image processing apparatus according to claim 1, wherein the processor is caused to further function as an input unit configured to accept a combining method input from a user, and
   wherein the combining method selection unit performs the selection according to the combining method accepted by the input unit.

6. The image processing apparatus according to claim 1, wherein the linear image is a RAW image.

7. The image processing apparatus according to claim 1, wherein the non-linear image is in a YUV format.

8. The image processing apparatus according to claim 1, wherein the combining method selection unit performs the selection based on whether to record a linear image after the combining.

9. The image processing apparatus according to claim 1, wherein the combining method selection unit performs the selection based on a frame rate of an image captured by an imaging apparatus.

10. The image processing apparatus according to claim 1, further comprising an image sensor configured to capture the plurality of images, wherein the processor is caused to further function as:
    a signal recording unit configured to record a combined image generated by the first and second combining units in a recording medium.

11. The image processing apparatus according to claim 10, wherein the image sensor has a stacked layer structure, generates the plurality of images by applying the different gains to the image acquired in one exposure, and outputs the images to the acquisition unit.

12. A method for controlling an image processing apparatus, the method comprising:
    acquiring a plurality of images generated by applying different gains to an image acquired in one exposure;
    first combining for performing combining by adjusting brightness of an image other than a first image with brightness of the first image among the plurality of images;
    second combining for performing combining by adjusting brightness of an image other than a second image with brightness of the second image, the second image being brighter than the first image among the plurality of images; and selecting which of the combining by the first combining and the combining by the second combining is to be used to combine the plurality of images acquired by the acquisition, wherein the second combining includes performing combining based on a linear image and performing combining based on a non-linear image.

13. A non-transitory computer-readable storage medium storing a program for causing a computer to execute the method for controlling an image processing apparatus according to claim 12.

\* \* \* \* \*